Figure 1:
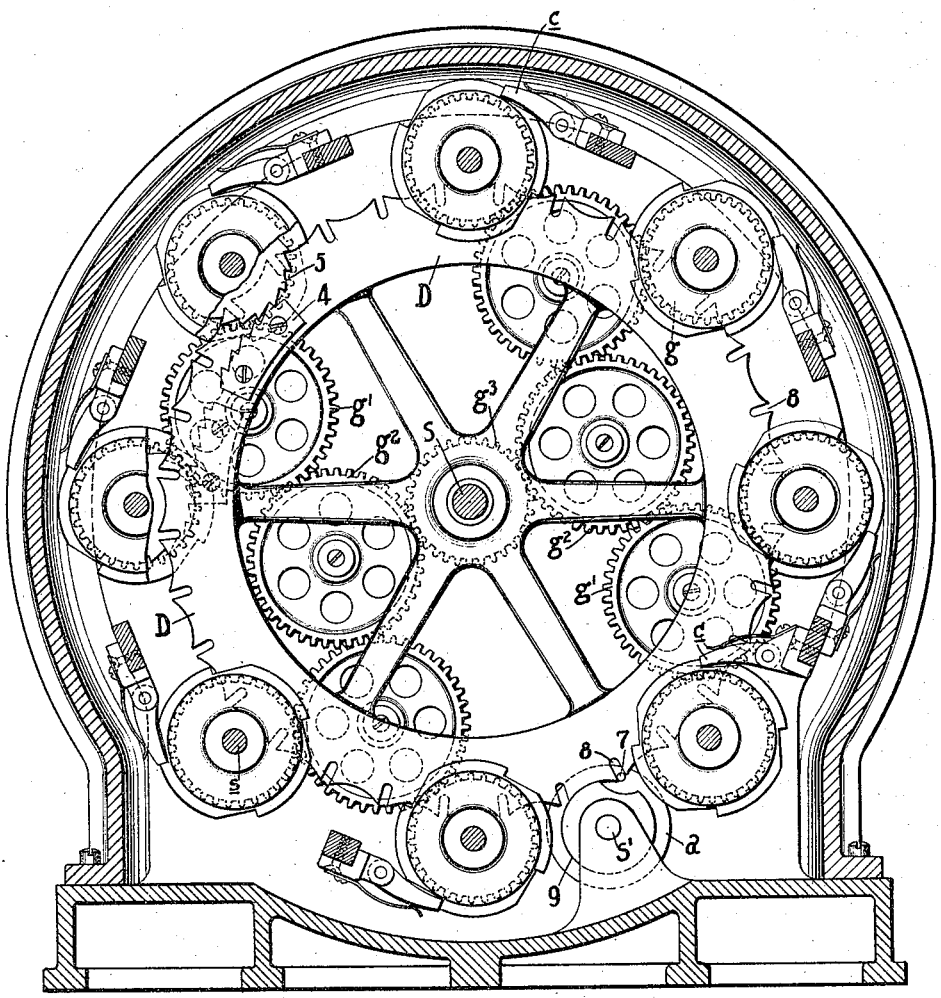

A. C. RUTZEN.
SELF WINDING SPRING MOTOR.
APPLICATION FILED JULY 10, 1914.

1,178,951.

Patented Apr. 11, 1916.
3 SHEETS—SHEET 1.

ATTEST

INVENTOR
A. C. RUTZEN
BY Fisher & Ulvart ATT'YS

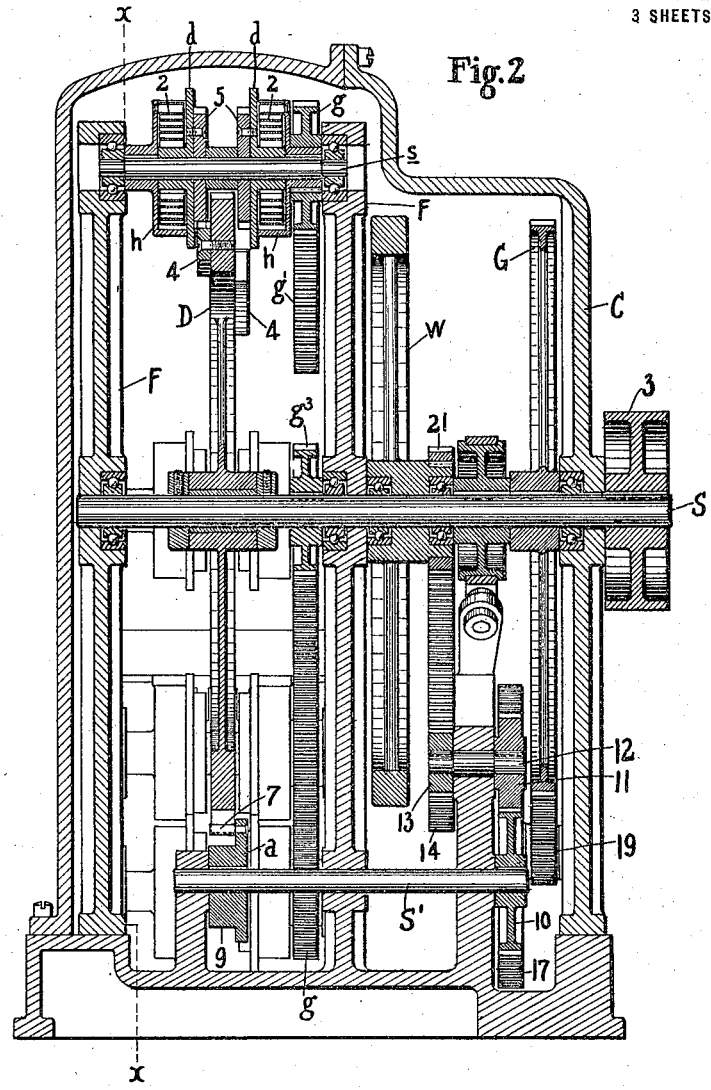

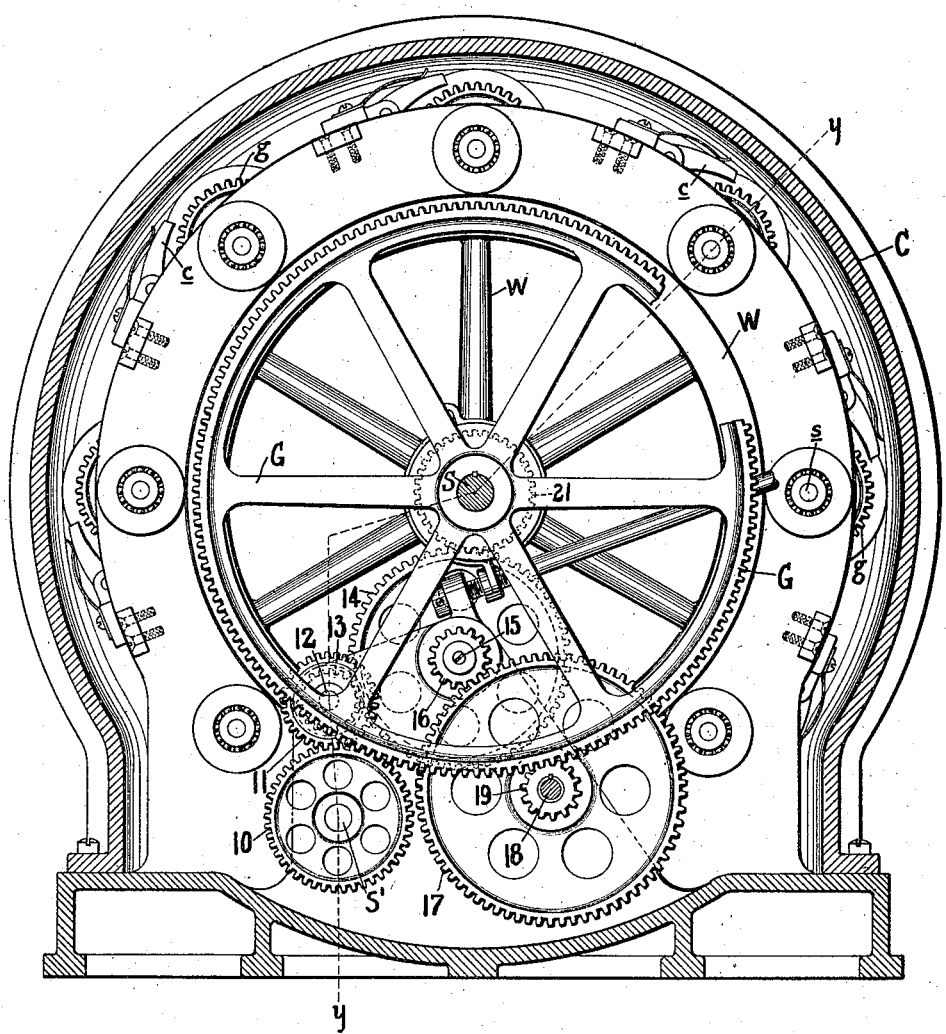

UNITED STATES PATENT OFFICE.

AUGUST C. RUTZEN, OF CLEVELAND, OHIO.

SELF-WINDING SPRING-MOTOR.

1,178,951.  Specification of Letters Patent.  Patented Apr. 11, 1916.

Application filed July 10, 1914. Serial No. 850,104.

*To all whom it may concern:*

Be it known that I, AUGUST C. RUTZEN, a citizen of the United States, residing at Cleveland, in the county of Cuyahoga and State of Ohio, have invented certain new and useful Improvements in Self-Winding Spring-Motors, of which the following is a specification.

This invention appertains to a self winding spring motor of the general type disclosed in sundry applications filed by me and particularly the parent application, Serial No. 809,851, the idea in all the said applications and in the present one being to take off a per cent. of the total power developed to re-wind the springs and to utilize the balance for strictly power purposes, all substantially as shown and described and particularly pointed out in the claims.

In the accompanying drawings, Figure 1 is a sectional side elevation of the machine on a line corresponding substantially to $x$—$x$, Fig. 2. Fig. 2 is a sectional elevation through the main shaft and otherwise on line of $y$—$y$, Fig. 3. Fig. 3, is a sectional elevation of the machine looking inward on line 3—3 Fig. 2.

As in previous applications so also in the present one, the invention comprises a close or hermetically sealed casing C, adapted to exclude dust, a driven or main shaft S, a series of power springs 2 mounted in pairs on shafts $s$ and disposed in a circle about shaft S and means for communicating the power of said springs to the main shaft. These means in this case consist of the gears $g$ on shafts $s$, the pinion $g^3$ on shaft S and the intermediate gears or idlers $g^1$ and $g^2$ meshed with each other and said pinion and primarily by gear $g$.

A frame indicated by F supports all the parts within the outer casing except the shaft S, which has antifriction bearings at one end in the said casing and carries a sheave or pulley 3 on its end outside the casing from which power is taken off for any power purpose. Possibly, it should be stated here that the plan of the invention contemplates the using of a fraction of the total power of the springs delivered to shaft S for re-winding purposes. Hence, the fact that after the several springs have been wound by hand, much as a clock is wound, the re-winding will proceed automatically and uniformly from spring to spring, first from one spring to the other in the same pair, or on the same shaft, and then to the next spring on the next shaft and so on until the entire round has been made and repeatedly as long as the machine is kept going. All re-winding is automatic, and the rewinding mechanism is so timed in making the circuit and the springs have such coil that each is re-wound before it has completely exhausted its resiliency.

The said re-winding mechanism, in the present case, comprises a housing $h$ for each spring fixed on shaft $s$ and having one end of the spring engaged therewith and the other end with the hub of the re-winding disk $d$, free to rotate on the said shaft $s$ and engaged by pawl $c$. Power is delivered to main shaft S from the spring shafts $s$ through gears or idlers $g$, $g^1$ and $g^2$ $g^3$ as above described, and re-winding is accomplished through the wheel D, which is loosely mounted between two collars on main shaft S, see Fig. 2. A pair of ratchet or toothed segments 4 are secured on opposite sides of wheel D to engage the ratchet disks 5 which are affixed to the disks $d$, and pawls $c$ engage the disks $d$ also to prevent a return movement thereof. The ratchet segments 4 are placed in a successive manner on the wheel D to engage each pair of ratchet disks 5 successively and thereby wind each pair of springs 2 successively on a given shaft $s$ before proceeding to the next shaft $s$ and its ratchet disks and springs. The said wheel D is rotated intermittently by a constantly rotating small wheel $a$ having a pin 7 adapted to enter the radial slots 8 at intervals in the peripheral edge of said wheel, and the said edge is incurved between successive slots to permit the small wheel $a$ to revolve while temporarily locking or holding the large wheel D against rotation, and for this purpose the said wheel $a$ has a reduced hub 9 of suitable diameter in engaging relations with the said curved or segmental edge of wheel D, see Fig. 1. The said small wheel $a$ is splined on a countershaft S', which has a gear 10 at one end which meshed by a smaller gear 11 on a stud shaft 12, and a pinion 13 on shaft 12 is engaged in turn by a large gear 14 on a short shaft 15 having a pinion 16 in mesh with a still larger gear 17 on another short shaft 18, which carries a small pinion 19 driven by the main gear G splined on the main shaft S. The fly wheel W is, therefore, driven at a very high speed by the train of gears G, 19, 17, 16 and 14, the power for this purpose being derived through a gear 21 fixed on the hub of fly wheel W and meshing with the gear 14, Figs. 2 and 3.

It will be seen that fly wheel W is intermediate the two wheels D and G and becomes the main factor in the re-winding operation by reason of the momentum and gravity thereof, which are intended to so effectually off-set or counter balance the immediate and momentary task of re-winding that no shock or check is experienced in the otherwise forward trend of the power mechanism. Obviously, the per cent. of power absorbed for re-winding, whatever it may be, is expended through the large gear G.

It will be observed that the space between the open slots in wheel D is equal to each forward rotation of said wheel in winding a given spring and of the rotation of the re-winding disk $d$ which controls the spring, and the said wheel D is at a pause while the actuating member or wheel $d$ completes a rotation or from the time that it leaves a slot at the left in Fig. 1 until it engages another at the right, as seen in said Fig. 1.

Respecting the operation of the machine herein described, it should be understood that I do not claim that the machine will run perpetually, nor do I mean to fix any length of time that it will run, because much will depend on the kind and amount of work that is put upon it. However, I do claim that the machine will do useful work for a longer or shorter period, subject to conditions, and that by the kind of springs and their disposition in the machine and the re-winding mechanism substantially as described, the duration of operation is materially prolonged over what would be possible with the same springs without such re-winding mechanism.

What I claim is:

1. In a spring power motor, a central shaft and a series of springs arranged about said shaft and in power relations therewith, and means to rewind said springs comprising a winding wheel free on said shaft and provided with radial slots at intervals in its periphery and an actuating wheel having a pin adapted to engage in said slots successively and move said wheel at intervals the distance between slots.

2. A spring power motor having a re-winding wheel for the springs provided with radial slots at intervals in its periphery and segmental depressions between slots, and a drive wheel therefor having a laterally projecting pin adapted to engage in said slots successively and a hub to engage said depressions.

3. A spring actuated motor having a central shaft and a series of power springs in a circle about the same and shafts carrying said springs geared to said central shaft, in combination with means to re-wind said springs comprising a wheel having open radial slots at intervals in its periphery and an actuating wheel having a pin adapted to engage in said slots successively and turn said wheel in advance at intervals the distance between slots and constructed to frictionally engage said wheel between slots.

4. A spring power motor comprising a series of springs arranged in a circle about a common center and means to re-wind each spring separately and at regular intervals comprising an individual winding mechanism for each spring, a wheel provided with means on opposite sides adapted to engage said re-winding mechanism successively and having open slots in its periphery spaced apart equal to the distance of each forward movement, and an actuating medium adapted to rotate said wheel intermittently having a projection to enter each of said slots successively and to leave each slot as the forward movement of said wheel is accomplished, and said actuating medium and wheel constructed to contact between slots.

In testimony whereof I affix my signature in presence of two witnesses.

AUGUST C. RUTZEN.

Witnesses:
H. W. George,
Myra Schwan.